Nov. 30, 1943.  L. J. BENSCHOTER  2,335,634
BOTTLE VALVE MANUFACTURE
Filed Dec. 10, 1941
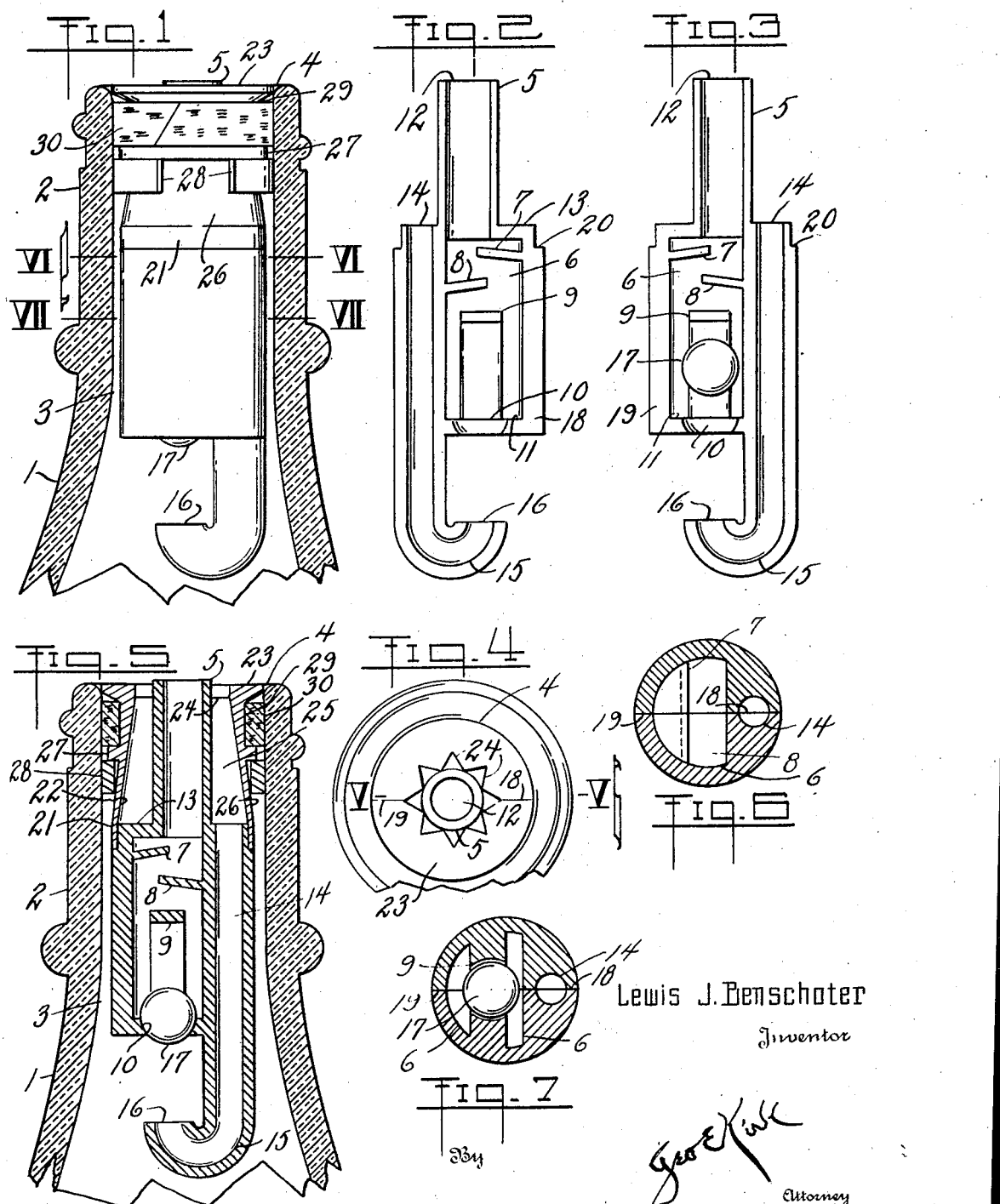
Lewis J. Benschoter
Inventor Patented Nov. 30, 1943

2,335,634

UNITED STATES PATENT OFFICE 2,335,634

BOTTLE VALVE MANUFACTURE

Lewis J. Benschoter, Toledo, Ohio, assignor to Eldon H. Young, Toledo, Ohio, as trustee Application December 10, 1941, Serial No. 422,384

2 Claims. (Cl. 215—21)

This invention relates to one-way flow control for a liquid from a vessel.

This invention has utility when incorporated in stoppers for bottles, which stoppers have ball check valves housed against mechanical and pneumatic refilling of such bottles.

Referring to the drawing:

Fig. 1 is a view in section of a neck of a vessel or bottle having an embodiment of the stopper or closure of the invention located therein;

Fig. 2 is an elevation of a longitudinal section of this stopper involving passage portions;

Fig. 3 is the complementary section of the passage portions and additionally the ball of the check valve;

Fig. 4 is a plan view of the stopper in closed position in the neck of a bottle;

Fig. 5 is a section on the line V—V, Fig. 4, showing the stopper unit in section in the neck of a bottle;

Fig. 6 is a section on the line VI—VI, Fig. 1, showing the duct sections of Figs. 2, 3, as assembled in the region of the baffle above the ball cage; and Fig. 7 is a section on the line VII—VII, Fig. 1, showing assembled complementary sections at the check valve ball.

Vessel or bottle 1 is herein shown as having neck 2 of symmetrical cylindrical interior 3 to terminal opening 4.

Under the invention herein, semi-cylindrical pouring duct section 5 rises from chamber section 6 having baffle sections 7, 8, therein in intercepting position from the duct section 5 as to cage section 9 further shielding valve seat 10. This seat 10 is in ledge 11 remote from pouring duct outflow portion 12. Surrounding this pouring duct section 5 is shoulder 13 spaced from the terminus 12. From this shoulder section 13 there is vent duct section 14 to return bend portion 15 having terminus 16 directed toward the seat 10. This cage section 8 may have check valve ball 17 located therein as planar face 18 of one of these sections is brought into bonding relation with opposing complementary planar face 19 of similar section. These two sections as thus assembled complete the pouring duct and vent duct portions as well as the chamber for the ball cage and house the check valve ball. Adjacent the ledge portion 13 there is provided annular seat 20 in these assembled sections, thereby to receive, as weld or bond assembled therewith, stopper portion sleeve 21 with inwardly tapering riser wall 22 therefrom to stopper head or face 23 surrounding the pouring duct outlet 5 with annular series of vent ports 24 thereabout. Below these ports 24 toward the shoulder 13, there is thus provided vent chamber 25, herein desirably designed of a capacity in excess of the capacity of the vent duct 14, 15, and with the valve seat 10 for the check valve of greater capacity than the vent duct terminus 16.

This stopper section has exterior taper seat portion 26 to shoulder 27. On this taper portion there may be located yieldable split ring 28, adapted fixedly to coact with the cylindrical interior 3 of the bottle neck, and as so gripping to ride away from the flange 27 in positively locking this pouring unit in the bottle neck against removal therefrom, thereby assuring for single service functioning hereunder as a non-refillable bottle. Packing for this stopper is had between the shoulder 27 and terminal 23 in seat 29 by insertion of split ring compressible gasket 30 therein.

Factors for consideration hereunder have to do with the particular use or liquid to be handled in the matter of the character of the material employed for the stopper. It is desirable this structure be not open to attack by the liquid handled. For instance, if the bottle be for a beverage of the alcoholic type, the elements should be resistant or not soluble in alcohol. Under these circumstances, the ball check valve 17 may be of glass, the major complementary sections carrying the ducts may be of a plastic insoluble in alcohol and readily bonded or welded together, say with acetate or the like type of bond or plastic weld unit. While these complementary portions (Figs. 2, 3) have a rigidity, the stopper section completing the vent chamber thereabout is desirably of a relatively more fragile structure even than the vessel walls. This is to the end that any attack or extraction of the stopper will wreck the unit.

The unit as herein disclosed is one which may be readily inserted into stopper position in a normal cylindrical neck of a bottle. As so located, it is adapted for ready pouring in any direction of uplift and orienting of the bottle. Inasmuch as the device is in the single service or non-refillable bottle field, the structure is one effective to such end. The baffles 7, 8, as well as the location of the cage 9 preclude reaching into the cage to disturb or hold the ball check valve 17 in any position to disturb functioning hereunder. There is, accordingly, safeguard against mechanical disturbance. Pneumatic disturbance is not effective for the reason that any attempt to exhaust the vessel, thereby to have intake be received by way of the normal vent, is ineffective for the vent direction is one to impinge and unseat the valve, thereby to short circuit any inflow by the vent for direct outflow independently of charging the vessel 1.

Face 23 flush or lower than the bottle outlet thereby avoids dripping in pouring of the liquid. Furthermore, it is to be noted this stopper unit in its assembly is countersunk or at a maximum not exceeding flush position with the top of the vessel or bottle. It thereby avoids exposure for attack by a gripping tool.

What is claimed and it is desired to secure by Letters Patent is:

1. For assembly in the straight neck of a vessel, a pouring stopper section having an outflow duct and a J-shaped vent duct, a check valve in the section, a cage for the valve continuous with the section, said section having an external wedge face seat, and a split ring wedged by said face seat into holding position for the stopper in the vessel neck.

2. A pouring device including stopper means providing a central outflow duct having a discharge port, there being means forming a vent complete through the stopper independent of the outflow duct, said vent providing a vent chamber encircling the duct and having ports about the duct discharge port, and a check valve ball having a cage housed in the stopper means and toward which the vent has a return bend outlet.

LEWIS J. BENSCHOTER.